United States Patent

[11] 3,624,422

| | | |
|---|---|---|
| [72] | Inventor | Masanari Suzuki<br>Yokohama, Japan |
| [21] | Appl. No. | 30,778 |
| [22] | Filed | Apr. 22, 1970 |
| [45] | Patented | Nov. 30, 1971 |
| [73] | Assignee | Ricoh Co., Ltd.<br>Tokyo, Japan |
| [32] | Priority | Apr. 23, 1969 |
| [33] | | Japan |
| [31] | | 44/31830 |

[54] CIRCUIT GENERATING HIGH VOLTAGE
1 Claim, 3 Drawing Figs.
[52] U.S. Cl. ............................................. 307/108
[51] Int. Cl. ............................................. H03k 3/00
[50] Field of Search............................................. 307/108,
110, 109, 106, 107, 252; 320/1

[56] References Cited
UNITED STATES PATENTS
2,462,918  3/1949  Stiefel .......................... 307/106

FOREIGN PATENTS
1,003,573  11/1951  France .......................... 307/106

*Primary Examiner*—Robert K. Schaefer
*Assistant Examiner*—M. Ginsburg
*Attorneys*—Henry T. Burke, Lester W. Clark, Robert S. Dunham, P. E. Henninger, Thomas F. Moran, Gerald W. Griffin, R. Bradlee Boal, Christopher C. Dunham and Robert Scobey

ABSTRACT: A circuit for generating high voltage comprising in combination an AC power source, an RC circuit, a pair of parallel connected switching element groups each consisting of at least one switching element exhibiting a negative resistance at a voltage in excess of a predetermined breakover voltage, pair of oppositely directed rectifier elements connected in parallel with each other to the junction of a capacitor and resistor of the RC circuit and in series to the pair of switching element groups respectively, and a transformer for inducing high voltage across its secondary. Larger output power is obtained.

INVENTOR
MASANARI SUZUKI

BY
Henry T. Burke ATTORNEY 3,624,422

CIRCUIT GENERATING HIGH VOLTAGE

BACKGROUND OF THE INVENTION

The present invention relates to a circuit for generating high voltage having a high output power and generating high voltage which can be smoothed in a rather simple manner. Circuits for generating high voltage are used in a wide variety of electrical machinery and equipment such as dust collectors, air cleaners, ignition devices for discharge lamp, electric ignition devices, electron accelerators, for example, in cathode ray tubes, X-ray apparatus, chargers for electrophotographic apparatus and so on.

A typical prior art high-voltage-generating circuit comprises in combination an RC circuit, a switching element which breaks over at a predetermined voltage and thereafter exhibits a negative resistance and a transformer. The input terminals are connected to a DC or AC power source so that the high voltage is derived across the secondary of the transformer in a manner well known in the art. The frequency of the pulse voltages derived from this circuit is dependent upon the RC time constant which in turn is dependent upon the highest frequency at which the switching element can operate. The input P to this circuit is generally expressed by $$P = f_b / 2C V^2$$

where $f_b$ = the highest frequency at which the switching element can operate;

$c$ = capacitance of the capacitor in RC circuit; and $v$ = breakover voltage of the switching element.

Thus, it is seen that the power of the circuit is dependent upon the highest frequency $f_b$ at which the switching element can operate. When the higher power is required at a frequency less than the highest frequency $f_b$, the charging resistor is made less in value or capacitance of the capacitor is increased. But in this case, the pulse current after the breakover of the switching element is increased and this inrush current must be less than the rating of the switching element. Therefore, capacitance of the capacitor is of course limited. Consequently, the power is determined by the highest frequency $f_b$ and current rating of the switching element. If a higher output power is required, the apparent breakover voltage of the switching element can be increased by connecting in series a plurality of switching elements without causing an excessive increase of inrush current so that, as seen from the above equation, the power may be increased in proportion to a square of the breakover voltage. The charging voltage of the capacitor, however, must be increased with increase of the breakdown voltage. This means the increase in power source voltage, so that the high-voltage-generating circuit becomes bulky, heavy in weight and expensive to manufacture.

SUMMARY OF THE INVENTION

The present invention has been made to overcome these related problems.

It is, therefore, an object of the present invention to provide a high-voltage-generating circuit having a higher power as compared with the conventional one same in size.

It is another object of the present invention to provide a high-voltage-generating circuit which can improve the efficiency of a transformer and also the voltage smoothing efficiency on a load side.

It is a further object of the present invention to provide a high-voltage-generating circuit compact in size, light in weight, efficient and reliable in operation and inexpensive to manufacture.

To attain these and other objects, the present invention provides an improved circuit for generating high voltage characterized by comprising, in combination, an AC power source, a capacitor which is charged through a charging resistor from said AC power source, a pair of switching element groups each consisting of at least one switching element which breaks over at a predetermined charged voltage across said capacitor and thereafter exhibits a negative resistance, two rectifier elements arranged in opposite direction with each other and each connected in series to one of said pair of switching element groups and a transformer in which a high voltage is induced across its secondary by the current discharged from said capacitor and flowing through its primary, said pair of switching element groups being connected in parallel with each other.

Because of the novel feature of the present invention of arranging a pair of parallel connected switching element groups each having a rectifier element connected in series thereto, the circuit for generating high voltage of the present invention can operate at a relatively low voltage of a power source and a high-voltage pulsation induced so that the input and output powers of the circuit can be increased, the transformer may be used more effectively and the operation for smoothing voltage on a load side may be much facilitated.

The above and other objects, features and advantages of the present invention will become more apparent from the following description of two illustrative embodiments thereof with reference to the accompanying drawing.

PRIOR ART

Figure 1:
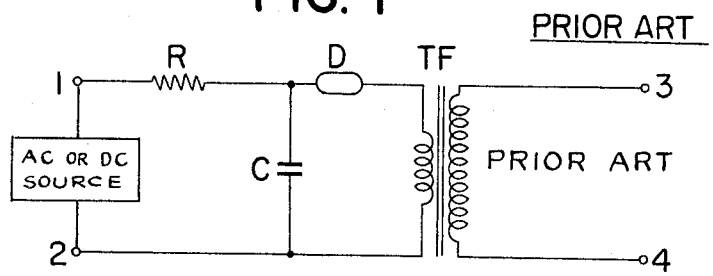
FIG. 1 is a circuit diagram of the prior art high-voltage generating for comparison with the present invention.

For the sake of better understanding of the present invention, the description is first directed to the prior art high voltage generating circuit as shown in FIG. 1 the improvement of which contemplates the present invention. In FIG. 1, a pair of input terminals 1 and 2 are connected to a DC or AC power source so that a capacitor C is charged through a charging resistor R. When the voltage across the capacitor C reaches the predetermined breakover voltage of a switching element D, which exhibits a negative resistance after the breakover, the element D conducts so that the voltage is applied across a primary of transformer TF, thereby inducing a high voltage across its secondary which can be derived across a pair of output terminals 3 and 4.

In the prior circuit of the type described above, the increase in a breakover voltage of a switching element results in the increase in the charging voltage across the capacitor C which in turn results in the increase in power source voltage, as described hereinbefore.

DESCRIPTION OF THE PREFERRED EMBODIMENT

Figure 2:
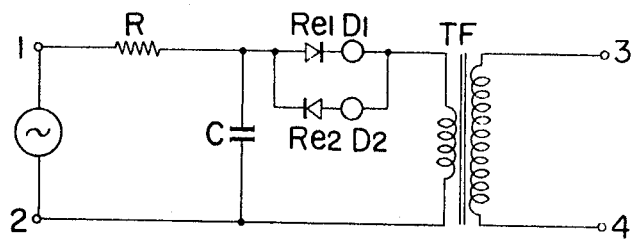
FIGS. 2 and 3 are circuit diagrams of two embodiments of the present invention. Throughout figures, same parts are designated by same characters and numerals.

FIG. 2 illustrates one embodiment of the present invention. The terminals 1 and 2 must be connected to an AC power source. Two switching elements $D_1$ and $D_2$ are connected as shown and rectifier elements $Re_1$ and $Re_2$ are connected to the elements $D_1$ and $D_2$ in the forward and reverse directions respectively. That is, the series-connected rectifier element $Re_1$ and switching element $D_1$ are connected in parallel to the series connected rectifier $Re_2$ and switching element $D_2$.

When the capacitor C is charged through the charging resistor R during a positive half-cycle of AC power, the charged capacitor C is discharged through the rectifier element $Re_2$ at a breakdown voltage of the switching element $D_1$. On the other hand, when the capacitor C is charged during a negative half-cycle of AC power, it is discharged through the rectifier element $Re_2$ and the switching element $D_2$. That is, when one of the switching elements $D_1$ and $D_2$ is conductive, the other is nonconductive. When the switching elements $D_1$ and $D_2$ can be operated at full capacity with due consideration for the conduction and nonconduction of these elements described above, the RC time constant may be doubled and the input and output of the circuit may be also doubled. The maximum rating of the switching elements $D_1$ and $D_2$ is depending upon the heat loss, so that it is readily seen that driving the switching element alternately into the conductive and nonconductive states allows it to cool, during one set of alternate half-cycles, thereby permitting the switching element to operate at full capacity. The switching elements of constant breakover voltage such as discharge tubes, semiconductors, etc. cannot be connected in parallel because their breakover voltages are different slightly from each other. According to the present invention, however, the parallel connection of switching elements becomes possible, so that the input and output of the circuit can be at least doubled.

The rate of charge of the capacitor C is determined by its capacitance and the resistance of resistor R. The rate of discharge of capacitor C is determined during the positive half-cycles of a potential by the forward resistance of the rectifier element $Re_1$, the resistance of the switching element $D_1$, the resistance and inductance to the primary winding of the transformer TF and the capacitance of capacitor C. The forward resistance of rectifier element $Re_1$ is very low, and the resistance of switching element $D_1$ is negative after it breaks down, as noted above. Hence, the discharge time of capacitor C is controlled primarily by the inductance of the primary winding. The discharge time after breakdown can thus be designed to be very fast, so that the rate of change of current flow in the transformer of primary winding is much higher than the rate of change of the current flow during the charging of the capacitor C. During negative half-cycles, the rectifier element $Re_2$ and the switching element $D_2$ perform a function similar to those of rectifier element $Re_1$ and switching element $D_1$ during the positive half-cycles. Thus, during each half-cycle the capacitor C discharges through a circuit of very low resistance, and at a time substantially after the beginning of the cycle, when the potential across the capacitor is approaching its peak value. The rate of change of current flow in the primary winding is therefore very high during both half cycles and results in the production of correspondingly high voltage in the secondary winding.

Figure 3:
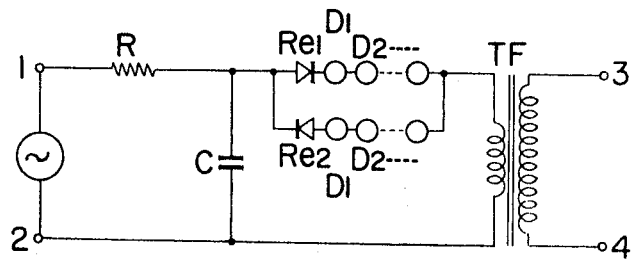

When a plurality of switching elements are connected in series as shown in FIG. 3, the input and output of the circuit can be further increased. Since these switching element groups are alternately operated, the decrease in efficiency of the transformer due to DC excitation can be advantageously prevented and the output frequency can be much improved, thereby improving the rectification and smoothing the pulsation on the load side.

I claim:

1. A circuit to be connected to a source of alternating electrical energy and effective when so connected to produce an output current at an alternating potential higher than that of the alternating source, comprising:
   a. a pair of input terminals;
   b. a resistor and a capacitor connected in series across said terminals so that the capacitor is charged through the resistor with charges of alternating polarity;
   c. a discharge circuit for the capacitor comprising, in series:
      1 the primary winding of a step-up output transformer; and
      2 a pair of parallel branches, each branch including, in series, an asymmetrically conductive device and at least one switching element having a characteristic predetermined breakdown potential and a characteristic negative resistance after said breakdown potential is exceeded, said devices in the pair of branches being oppositely poled, so that one branch conducts only during the alternate half-cycles of one polarity and the other branch conducts only during the half-cycles of the opposite polarity, each said branch having a low resistance after its switching element breaks down to its negative resistance condition, so that the discharge time of the capacitor, after said breakdown potential is reached, is determined principally by the inductance of the transformer primary and the capacitance of the capacitor; and
   d. a secondary winding for said output transformer connected to a pair of output terminals.

* * * * *